(12) United States Patent
Hong et al.

(10) Patent No.: US 10,005,062 B2
(45) Date of Patent: Jun. 26, 2018

(54) APPARATUS FOR MANUFACTURING PARTICLES AND METHOD FOR MANUFACTURING PARTICLES USING THE SAME

(71) Applicant: LAMINAR CO., LTD, Seongnam-si, Gyeonggi-Do (KR)

(72) Inventors: Jong Pal Hong, Seoul (KR); Gyeong Rye Choi, Seongnam-si (KR)

(73) Assignee: LAMINAR CO., LTD, Seongnam-si (KR)

( * ) Notice: Subject to any disclaimer, the term of this patent is extended or adjusted under 35 U.S.C. 154(b) by 355 days.

(21) Appl. No.: 14/424,120

(22) PCT Filed: Jun. 11, 2014

(86) PCT No.: PCT/KR2014/005091
§ 371 (c)(1),
(2) Date: Feb. 26, 2015

(87) PCT Pub. No.: WO2014/204125
PCT Pub. Date: Dec. 24, 2014

(65) Prior Publication Data
US 2016/0001253 A1    Jan. 7, 2016

(30) Foreign Application Priority Data

Jun. 17, 2013    (KR) .................. 10-2013-0068881

(51) Int. Cl.
*B01J 19/24*    (2006.01)
*B01J 19/20*    (2006.01)
(Continued)

(52) U.S. Cl.
CPC .............. *B01J 19/24* (2013.01); *B01J 8/10* (2013.01); *B01J 19/1806* (2013.01);
(Continued)

(58) Field of Classification Search
CPC ... B01J 19/24; B01J 19/20; B01J 19/28; B01J 19/1862; B01J 19/1806; B01J 2219/00094;
(Continued)

(56) References Cited

U.S. PATENT DOCUMENTS 4,302,166 A    11/1981    Fulwyler et al.
4,744,821 A    5/1988    Yabuki et al.
(Continued)

FOREIGN PATENT DOCUMENTS

EP    0529978 A1    3/1993
JP    05-194643 A    8/1993
(Continued)

*Primary Examiner* — Melvin C. Mayes
*Assistant Examiner* — Smita S Patel
(74) *Attorney, Agent, or Firm* — Im IP Law; C. Andrew Im

(57) ABSTRACT

Apparatus for manufacturing particles has at least one reactor and a method for manufacturing particles using the same. A first reactor has a hollow main body extending in the lengthwise direction, first and second raw material inlets formed at the one side end of the main body, a reactant outlet formed at the other side end of the main body, and a mixer formed inside the main body to mix materials fed from the first and second raw material inlets. A second reactor of the apparatus connected to one side of the first reactor has a non-revolving hollow cylinder extending in the lengthwise direction, a revolving body extending in the lengthwise direction, a driver portion, a reactant inlet formed on the outer circumference at one side end of the cylinder and connected to the reactant outlet of the first reactor.

4 Claims, 4 Drawing Sheets

(51) Int. Cl.
*B01J 8/10* (2006.01)
*B01J 19/18* (2006.01)
*B01J 19/28* (2006.01)
*B22F 9/24* (2006.01)
*C01B 33/12* (2006.01)
*C01B 33/18* (2006.01)

(52) U.S. Cl.
CPC ........... *B01J 19/1862* (2013.01); *B01J 19/20* (2013.01); *B01J 19/28* (2013.01); *B22F 9/24* (2013.01); *C01B 33/12* (2013.01); *C01B 33/18* (2013.01); *B01J 2208/00212* (2013.01); *B01J 2219/00094* (2013.01); *B01J 2219/00189* (2013.01); *B01J 2219/00873* (2013.01); *B01J 2219/00889* (2013.01); *B01J 2219/00894* (2013.01); *B01J 2219/00905* (2013.01); *B01J 2219/1943* (2013.01)

(58) Field of Classification Search
CPC ...... B01J 2219/00189; B01J 2219/1943; B01J 2219/00905; B01J 2219/00894; B01J 2219/00889; B01J 2219/00873; B01J 8/10; C01B 33/12; C01B 33/18; B22F 9/24

See application file for complete search history.

(56) References Cited

U.S. PATENT DOCUMENTS

| | | |
|---|---|---|
| 4,787,935 A | 11/1988 | Eylon et al. |
| 5,411,602 A | 5/1995 | Hayes |
| 5,863,996 A | 1/1999 | Graham |
| 7,115,687 B2 | 10/2006 | Vuorikari et al. |
| 8,807,176 B2 | 8/2014 | Hilliard, Jr. et al. |
| 2014/0147338 A1 | 5/2014 | Hong et al. |

FOREIGN PATENT DOCUMENTS

| | | |
|---|---|---|
| JP | 2006-504821 A | 2/2006 |
| KR | 10-2011-0123285 A | 11/2011 |
| KR | 10-1092337 B1 | 12/2011 |
| KR | 10-2012-0092428 A | 8/2012 |

[Fig.1]
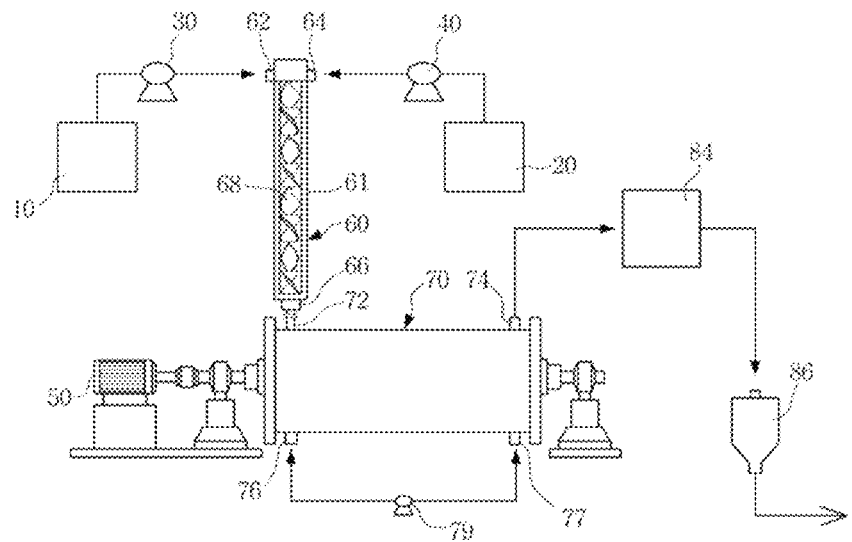
[Fig.2]
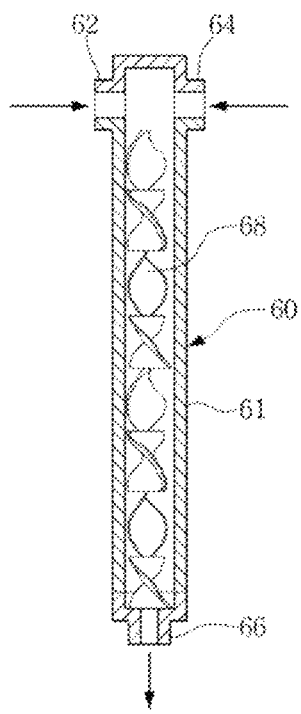

[Fig.3]
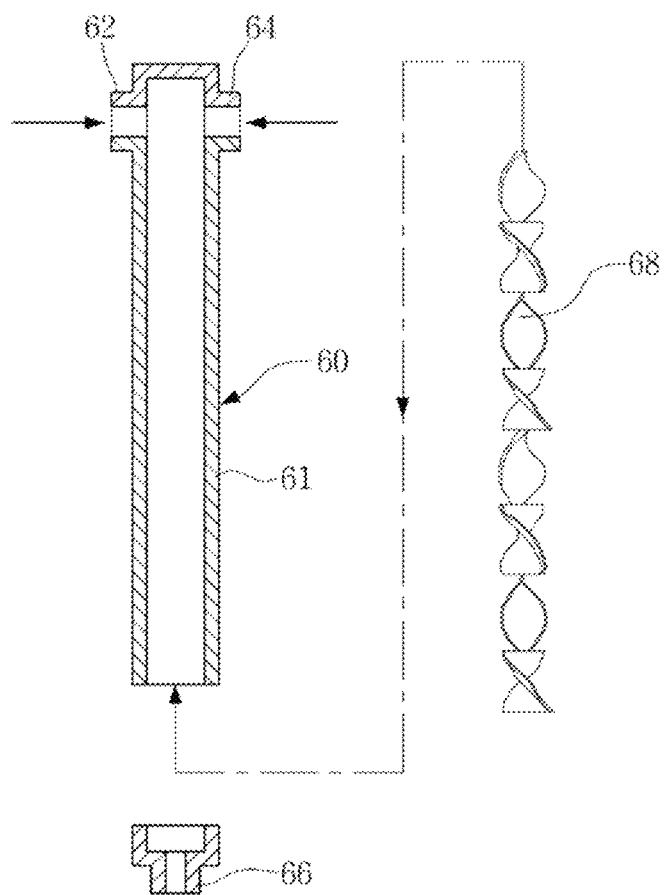

[Fig.4]
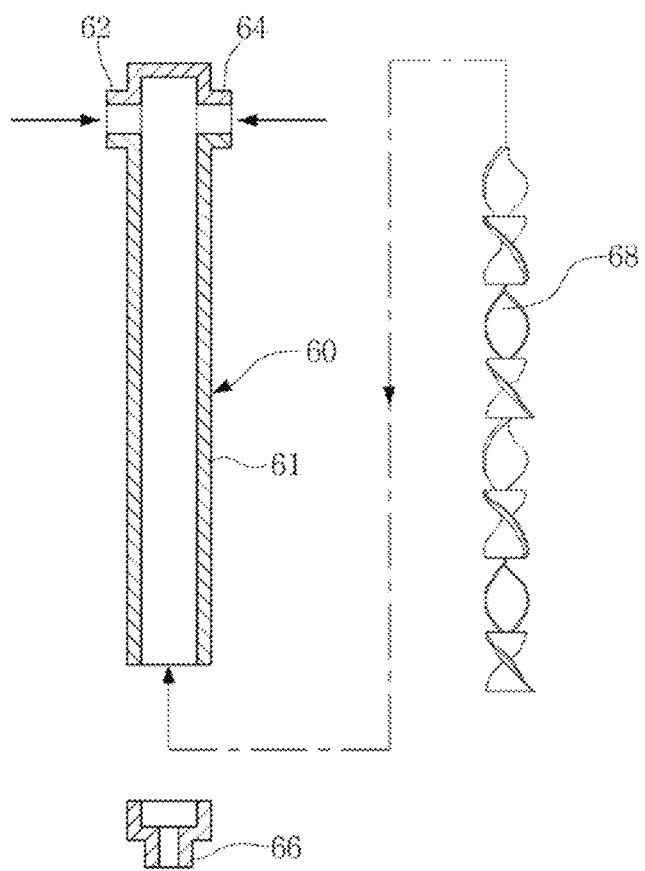

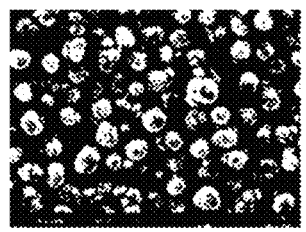
[Fig. 5A]
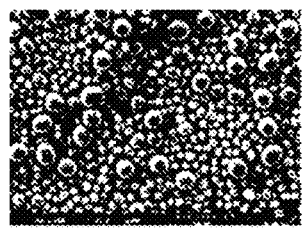
[Fig. 5B]
[Fig. 6A]
[Fig. 6B]
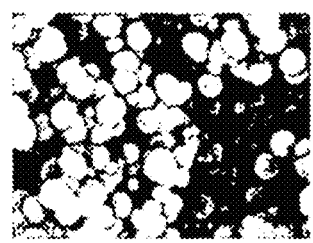
[Fig. 6C]

APPARATUS FOR MANUFACTURING PARTICLES AND METHOD FOR MANUFACTURING PARTICLES USING THE SAME

RELATED APPLICATIONS

This application is a § 371 application from PCT/KR2014/005091 filed Jun. 11, 2014, which claims priority from Korean Patent Application No. 10-2013-0068881 filed Jun. 17, 2013, each of which is herein incorporated by reference in its entirety

TECHNICAL FIELD

The present invention relates to an apparatus for manufacturing particles and a method for manufacturing particles using the same and, more particularly to, an apparatus for manufacturing particles that is designed to feed materials for forming particles to a device including at least two reactors connected in sequence to produce dispersed particles with high purity, and a method for manufacturing particles using the apparatus.

BACKGROUND ART

Conventionally, polymer or inorganic particles have been manufacture by the batch process, because it is impossible to continuously synthesize monodisperse polymer particles or inorganic particles of a desired particle size, a desired degree of cross-linking and a desired structure.

For example, U.S. Pat. No. 5,863,996 discloses a batch process for manufacturing polymer particles.

In order to obtain a desired product, the batch process for manufacturing polymer particles includes feeding monomers or reactants containing monomers into a batch reactor to perform a polymerization reaction and separately performing a plurality of processes, such as cooling down, removing and washing the polymer.

U.S. Pat. No. 5,411,602 discloses another method for manufacturing particles that includes spraying minute solder particles into an inert gas flow with a sprayer and capturing solidified balls. U.S. Pat. No. 4,744,821 describes a method of forming minute particles and passing them through oil and water layers. U.S. Pat. No. 4,302,166 discloses an apparatus for forming minute particles that involves dropping particles into an aqueous solution of nonionic surfactant. U.S. Pat. No. 4,787,935 describes a method for producing powder by cooling down a fluid in a stream of vortex to solidify into minute particles.

However, the conventional apparatuses or methods for manufacturing particles are not only inappropriate to produce particles having a wide particle size distribution, like inorganic particles such as silica particles other than polymer particles but also problematic in that the particles thus produced are of a non-uniform size, an uneven surface, and a low purity.

In an example to prepare inorganic particles, Korean Patent Publication No. 10-2012-0092428 discloses an apparatus for manufacturing silica particles used as a silicon source for large-scaled production of SiC with high purity that is in the spotlight as a material having low density, high melting point, high strength at high temperature, high thermal resistance and high oxidation resistance for use purpose in all kinds of heat-resistant structural members, industrial furnace members, next-generation heat exchangers, gas turbines, and piston engines.

However, the conventional apparatus for manufacturing silica particles that uses batch reactors is unsuitable for use in the continuous process, produces particles with low purity and non-uniform particle size and hardly forms the particles in globular shape.

OBJECT AND SUMMARY OF THE INVENTION

For solving the problem with the prior art, it is an object of the present invention to provide an apparatus for manufacturing particles that is designed to feed a device including at least two reactors connected in sequence with a material for manufacturing particles to produce uniformly dispersed particles with high purity, and a method for manufacturing particles using the apparatus.

In accordance with one embodiment of the present invention, in order to achieve the object of the present invention, there is provided an apparatus for manufacturing particles that includes: at least one first reactor, where the first reactor includes a hollow main body extending in the lengthwise direction, first and second raw material inlets formed at the one side end of the main body to open into the main body, a reactant outlet formed at the other side end of the main body in position to the first and second raw material inlets to open into the main body, and a mixing means formed in the hollow inside of the main body to mix materials fed from the first and second raw material inlets; a second reactor connected to the one side of the first reactor, where the second reactor includes a non-revolving hollow cylinder extending in the lengthwise direction, a revolving body extending in the lengthwise direction to separate from the inner wall of the cylinder, a driver portion connected to the one side end of the revolving body to rotate the revolving body, a reactant inlet formed on the outer circumference at the one side end of the cylinder based on the lengthwise direction of the cylinder to open into the cylinder and connected to the reactant outlet of the first reactor, an outlet formed at the other side end of the cylinder in opposition to the reactant inlet to open into the cylinder, a heat exchanger material passage formed between the outer circumference and inner circumference of the cylinder to provide a passage for a heat exchanger material, a heat exchanger material inlet connected to the heat exchanger material passage to feed the heat exchanger material, and a heat exchanger material outlet connected to the heat exchanger material passage to discharge the heat exchanger material; a first storage portion connected to the first raw material inlet of the first reactor; and a second storage portion connected to the second raw material inlet of the first reactor.

In accordance with another embodiment of the present invention, there is provided a method for manufacturing particles that includes: a reactor connecting step for connecting first and second storage portions storing a material for forming particles to the one side end of a hollow main body extending in the lengthwise direction and then connecting the one side of the main body to a non-revolving hollow cylinder extending in the lengthwise direction; a buffer solution filling step for filling a buffer solution between the inner wall of the cylinder and a revolving body built in the cylinder and extending in the lengthwise direction to separate from the inner wall of the cylinder and then discharging air to outside; a rotating step for rotating the revolving body after completion of the buffer solution filling step; a first reaction step for feeding a raw material of the first and second storage portions storing a material for forming particles into the main body to cause a reaction by mixing after completion of the rotating step; a second reaction step for feeding a reactant after completion of the first reaction step into the cylinder while the revolving body is rotating; and a solid-liquid separating step for performing a solid-liquid separation of liquids containing particles formed through the second reaction step.

The present invention is designed to feed a device including at least two reactors connected in sequence with a material for manufacturing particles to produce uniformly dispersed particles with high purity.

BRIEF DESCRIPTION OF DRAWINGS

FIG. 1 is an illustration showing the entire configuration of an apparatus for manufacturing particles according to the present invention.

FIG. 2 is a cross-sectional view showing an example of a first reactor included in the apparatus for manufacturing particles according to the present invention.

FIG. 3 is an exploded cross-sectional view showing an example of the first reactor included in the apparatus for manufacturing particles according to the present invention.

FIG. 4 is a cross-sectional view showing a second reactor included in the apparatus for manufacturing particles according to the present invention.

FIGS. 5A-B are observed images from the SEM analyzer for metal particles prepared according to Example 1 and Comparative Example 1, respectively, according the present invention.

FIGS. 6A-6C are observed images from the SEM analyzer for silica particles prepared according to Example 2 and Comparative Examples 2 and 3, respectively, according the present invention.

DETAILED DESCRIPTION OF THE EMBODIMENTS

Hereinafter, a detailed description will be given as to the present invention with reference to the attached drawings. It will be understood that the following description is given only to explain the present invention specifically and not intended to limit the scope of the present invention.

As illustrated in FIGS. 1 to 4, an apparatus for manufacturing particles according to the present invention includes: a first reactor 60, which includes a hollow main body 61 extending in the lengthwise direction, first and second raw material inlets 62 and 64 formed at the one side end of the main body 61 to open into the main body 61, a reactant outlet 66 formed at the other side end of the main body 61 in position to the first and second raw material inlets 62 and 64 to open into the main body 61, and a mixing means 68 formed in the hollow inside of the main body 61 to mix materials fed from the first and second raw material inlets 62 and 64; a second reactor 70, which includes a non-revolving hollow cylinder 80 extending in the lengthwise direction, a revolving body 82 extending in the lengthwise direction and built in the second reactor 70 to separate from the inner wall of the cylinder 80, a driver portion 50 connected to the one side end of the revolving body 82 to rotate the revolving body 82, a reactant inlet 72 formed on the outer circumference at the one side end of the cylinder 80 based on the lengthwise direction of the cylinder 80 to open into the cylinder 80 and connected to the reactant outlet 66 of the first reactor 60, an outlet 74 formed at the other side end of the cylinder 80 in opposition to the reactant inlet 72 to open into the cylinder 80, a heat exchanger material passage 78 formed between the outer circumference and inner circumference of the cylinder 80 to provide a passage for a heat exchanger material, a heat exchanger material inlet 76 connected to the heat exchanger material passage 78 to feed the heat exchanger material, and a heat exchanger material outlet 77 connected to the heat exchanger material passage 78 to discharge the heat exchanger material; a first storage portion 10 connected to the first raw material inlet 62 of the first reactor 60; and a second storage portion 20 connected to the second raw material inlet 64 of the first reactor 60.

The apparatus for manufacturing particles according to the present invention is to manufacture polymer particles, such as poly(methyl methacrylate) (PMMA) particles, polystyrene (PS) particles or styrene-acryl particles, or inorganic particles, such as silica particles or metal particles, and preferably includes at least two reactors connected in sequence to manufacture particles by mixing and reaction, if not specifically limited as long as it is a general particle manufacturing apparatus known in the related art for this purpose.

At this, for better explanation of the present invention, the one of the at least two reactors is referred to as the first reactor 60, the other the second reactor 70.

The first reactor 60 includes the hollow main body 61 extending in the lengthwise direction, the first and second raw material inlets 62 and 64 formed at the one side end of the main body 61 to open into the main body 61, the reactant outlet 66 formed at the other side end of the main body 61 in position to the first and second raw material inlets 62 and 64 to open into the main body 61, and the mixing means 68 formed in the hollow inside of the main body 61 to mix materials fed from the first and second raw material inlets 62 and 64.

The main body 61 according to the present invention is not only to form the outer appearance of the reactor, specifically the first reactor 60, but also to provide a space in which the raw materials are mixed together to participate in a reaction.

If not specifically limited as long as it is made of a material generally used in the related art, the main body 61 according to the present invention is desirably made of a stainless material that is not susceptible to contamination or deformation.

The first and second raw material inlets 62 and 64 according to the present invention are passages through which the raw materials for manufacturing particles are fed and mixed together to participate in a reaction, where the first raw material inlet 62 is connected to the first storage portion 10 and the second raw material inlet 64 is connected to the second storage portion 20.

In this regard, a first pump 30 is connected between the first storage portion 10 storing a raw material for manufacturing particles and the first raw material inlet 62 connected to the first storage portion 10 to feed the stored raw material, and a second pump 40 is connected between the second storage portion 20 storing another raw material for manufacturing particles and the second raw material inlet 64 connected to the second storage portion 20 to feed the stored raw material. In this manner, it is possible to control the supplied amount of the raw materials.

At this, the first and second pumps 30 and 40 are preferably bath pumps.

The reactant outlet 66 according to the present invention is formed at the other side end of the main body 61 in position to the first and second raw material inlets 62 and 64 which are formed on the main body 61 extending in the lengthwise direction, to provide a passage through which the raw materials fed into the first and second raw material inlets 62 and 64 participate in a reaction in the main body 61 and get discharged to outside.

At this, the reactant outlet 66 is directly connected to the one side of the second reactor 70, such as, for example, the reactant inlet 72 of the second reactor 70 to prevent the reactant discharged through the reactant outlet 66 from leaking to outside.

The mixing means according to the present invention is provided in the hollow inside of the main body 61 to mix the materials fed from the first and second raw material inlets 62 and 64. The mixing means is not specifically limited as long as it is a general mixing means 68 used for the defined purpose as known in the related art.

Preferably, the mixing means 68 may take the form of a screw, more preferably, if not limited to, a screw extending in the lengthwise direction along the hollow inside of the main body 61. Depending on the user's choice, the mixing means 68 may be a high-speed rotary mixer, a fan, or a turbine.

In accordance with one specific embodiment of the present invention, the first reactor 60 according to the present invention may be constructed to have at least two first reactors 60 connected to each other, with the first reactor 60 at the end being connected to the second reactor 70.

On the other hand, the second reactor 70 according to the present invention may be connected to the first reactor 60 so that the reactant supplied from the first reactor 60, specifically the reactant forming nuclei while passing through the first reactor 60, can participate in a reaction to form into uniform particles with high purity through crystallization.

The second reactor 70, which is a reactor that forms Taylor vortex flows, is constructed in the form of a system that includes the cylinder 80 and the revolving body 82 of which the central axes are basically extending in the same lengthwise direction, the reactant inlet 72, the outlet 74, and the driver portion 50 driving the rotation of the revolving body 82 built in the cylinder 80.

In this regard, the Taylor vortex flows of the second reactor 70 form a ring arrangement while in the ionic state, but they do not form a ring arrangement during the crystallization process after the nucleation for forming particles. This can lead to production of uniform particles.

Particularly, the second reactor 70 has the difficulty of forming uniform particles in the case of using materials of which the ions take time to form into nuclei for manufacturing particles, such as hydrolyzable materials. In order to solve this problem, however, the present invention has the first reactor 60 connected to the front end of the second reactor 70 so that forming nuclei for production of particles (nucleation) and growing crystals (crystallization) take place separately.

In the apparatus for manufacturing particles according to the present invention, accordingly, the first reactor 60 involves forming nuclei for production of particles (nucleation) and the second reactor 60 involves growing crystals (crystallization).

Meanwhile, the material to be reacted, specifically the reactant participating in a reaction in the first reactor 60 and forming nuclei, is continuously supplied between the cylinder 80 and the revolving body 82 through the reactant inlet 72.

At this, the reactant fed through the reactant inlet 72 forms a flow by means of the revolving body 82 driven by the driver portion 50.

It is recommended that the driver portion 50 is a change-speed mixing motor capable of adjusting the rotational speed in the range of 10 to 2,000 rpm.

Laminar Couette flows are produced when the angular speed of the revolving body 82 is low. With an increase in the angular speed of the revolving body 82, fluids tend to move in the direction of the outer cylindrical direction and thus become unstable to form Taylor vortex flows at a specific threshold speed or above.

Taylor vortex flows form a very regular ring arrangement in the axial direction and rotate in the opposite direction to each other, so they hardly mix together in the axial direction, which induces a uniform mixing of the reactants and thereby forms particles as reaction products.

The second reactor 70 according to the present invention is enabled to control the reaction of forming particles through a control of the temperature.

In order to raise or lower the temperature of the second reactor 70, the heat changer material passage 78 is formed to provide a passage for a heat exchanger material between the outer circumference and inner circumference of the cylinder 80, and the heat exchanger material inlet 76 and the heat exchanger material outlet 77 are formed on the heat exchanger material passage 78 to feed or discharge the heat exchanger material.

In this regard, the heat exchanger material may be a material generally used in the related art, such as a coolant, water vapor, water, etc.

Specifically, the heat exchanger material passage 78 according to the present invention may be formed in plural or into a radial structure between the inner circumference and outer circumference of the cylinder 80 in order to adjust the internal temperature of the second reactor more rapidly.

At this, the second reactor 70 may further include a circulating pump 79 for circulating the heat exchanger material between the heat exchanger material inlet 76 and the heat exchanger material outlet 77 to continuously circulate the heat exchanger material.

In accordance with one specific embodiment, the apparatus for manufacturing particles according to the present invention may include a variety of measurement devices connected to the raw material inlets 62 and 64, the reactant outlet 66, the reactant inlet 72, and/or the outlet 74, respectively.

For example, there may be amounted property measurement instruments, such as pH meters, PSA, IR, conductivity analyzers, or particle shape analyzers, or sonicators.

This is for real-time measurement of necessary information such as the properties of the reactants and products.

In accordance with another embodiment, the apparatus for manufacturing particles according to the present invention may further include a solid-liquid separator portion 84 for performing a solid-liquid separation of the particle-containing product from the second reactor 70.

In this regard, the solid-liquid separator portion 84 is connected to the outlet 74 of the second reactor 70 to perform a solid-liquid separation of the product discharged from the outlet 74, that is, for example, a particle-containing liquid. The solid-liquid separator portion 84 may be any solid-liquid separator generally used in the related art for this use purpose and preferably include a centrifugal separator or a dehydrator.

In accordance with still another embodiment, the apparatus for manufacturing particles according to the present invention may has a dryer portion 86 connected to the rear end of the solid-liquid separator portion 84 to dry out the solid particles, specifically desired particles, from the solid-liquid separator portion 84.

The drying method of the dryer portion 86 may be any method generally used in the related art.

In accordance with still further another embodiment, the apparatus for manufacturing particles according to the present invention may further include a scanning electron microscope connected at the rear end of the dryer portion 86 to analyze the shape and particle size uniformity of the dried particles.

In accordance with still further another embodiment, the apparatus for manufacturing particles according to the present invention may further include a densitometer connected at the rear end of the scanning electron microscope to measure the density of the cationic active material composed of particles.

Hereinafter, a description will be given as to a method for manufacturing particles using the above-constructed apparatus for manufacturing particles according to the present invention.

The method for manufacturing particles includes: a reactor connecting step for connecting the first and second storage portions 10 and 20 storing a material for forming particles to the one side end of the hollow main body 61 extending in the lengthwise direction and then connecting the one side of the main body 61 to the non-revolving hollow cylinder 80 extending in the lengthwise direction; a buffer solution filling step for filling a buffer solution between the inner wall of the cylinder 80 and a revolving body 82 built in the cylinder 80 and extending in the lengthwise direction to separate from the inner wall of the cylinder 80 and then discharging air to outside; a rotating step for rotating the revolving body after completion of the buffer solution filling step; a first reaction step for feeding a raw material of the first and second storage portions 10 and 20 storing a material for forming particles into the main body 61 to cause a reaction by mixing after completion of the rotating step; a second reaction step for feeding a reactant after completion of the first reaction step into the cylinder 80 while the revolving body 82 is rotating; and a solid-liquid separating step for performing a solid-liquid separation of liquids containing particles formed through the second reaction step.

In this regard, the first reaction step involves mixing raw materials to form into nuclei and the second reaction step involves growing the nuclei formed in the first reaction step into crystals to form particles.

The rotational speed of the revolving body 82 is preferably 10 rpm or higher.

Further, the buffer solution is not specifically limited as long as it is any buffer solution generally used in the related art.

The particle-containing liquids isolated in the solid-liquid separating step are those that the reactants in the reactors turn to the normal state.

In accordance with one embodiment, the method may further include a drying step for drying out the isolated particles after the solid-liquid separating step.

On the other hand, the particles produced according to the present invention preferably have a diameter, if not specifically limited to, of several nanometers to several micrometers.

Hereinafter, the present invention will be described in further detail with reference to the following examples, which are given only for specific explanation of the present invention and not intended to limit the scope of the present invention.

Example 1

A metal solution containing a mixture of nickel (Ni), manganese (Mn) and cobalt (Co) at a weight ratio of 5:2:3 is filled into the first storage portion maintained at 50° C., and a 4M NaOH solution and a 28% ammonia solution are filled into the second and third storage portions, respectively.

The first, second and third storage portions are connected to the one side end of the hollow main body extending in the lengthwise direction, and the one side of the main body is then connected to the non-revolving hollow cylinder extending in the lengthwise direction.

A buffer solution is filled into the cylinder, and the air remaining in the cylinder is discharged to outside.

Subsequently, a motor is driven to rotate the revolving body of the reactor at 1,000 rpm, which reactor is connected to the motor.

A batch pump is used to feed the solution stored in the first storage portion into the main body at a rate of 1.98 ml/min, the solution stored in the second storage portion into the main body at 2.0 ml/min and the solution stored in the third storage portion into the main body at 0.7 ml/min. After the first reaction of the solutions, the reactants are fed into the cylinder to participate in the second reaction and form metal particles.

At this, the retention time of the reactants is about 8 hours, with the reaction temperature maintained at about 50° C.

Subsequently, the liquid containing the metal particles is subjected to a solid-liquid separation using a centrifugal separator so that solid particles are separated from the liquid. The particles are dried out into the final metal particles.

Example 2

A mixed solution containing 250 ml of ethanol, 120 ml of distilled water and 8 ml of ammonia water is filled into the first storage portion maintained at 40° C., and a TEOS (purity 3N5) solution is filled into the second storage portion.

The first and second storage portions are connected to the one side end of the hollow main body extending in the lengthwise direction, and the one side of the main body is then connected to the non-revolving hollow cylinder extending in the lengthwise direction.

A buffer solution is filled into the cylinder, and the air remaining in the cylinder is discharged to outside.

Subsequently, a motor is driven to rotate the revolving body of the reactor at 1,000 rpm, which reactor is connected to the motor.

A batch pump is used to feed the solution stored in the first storage portion into the main body at a rate of 3.136 ml/min and the solution stored in the second storage portion into the main body at 0.18 ml/min. After the first reaction of the solutions, the reactants are fed into the cylinder to participate in the second reaction and form silica particles.

At this, the retention time of the reactants is about 30 minutes, with the reaction temperature maintained at about 40° C.

Subsequently, the liquid containing the silica particles is subjected to a solid-liquid separation using a centrifugal separator so that solid particles are separated from the liquid. The particles are dried out into the final silica particles.

Comparative Example 1

A metal solution containing a mixture of nickel (Ni), manganese (Mn) and cobalt (Co) at a weight ratio of 5:2:3, a 4M-NaOH solution and a 28% ammonia solution are filled into a beaker type CSTR reactor and reacted at 50° C. for 8 hours to form metal particles.

Comparative Example 2

A mixed solution containing 250 ml of ethanol, 120 ml of distilled water and 8 ml of ammonia water is warmed up to 40° C. The mixed solution together with a TEOS (purity 3N5) solution is then put into a bath reactor and stirred to form silica particles.

At this, the stirring time for the reactants is about 30 minutes and the reaction temperature is maintained at about 40° C.

Comparative Example 3

First, a buffer solution is filled into the cylinder constituting the second reactor, and the air remaining in the cylinder is discharged to outside.

Subsequently, a motor is driven to rotate the revolving body of the reactor at 1,000 rpm, which reactor is connected to the motor.

A batch pump is used to feed a mixed solution containing 250 ml of ethanol, 120 ml of distilled water and 8 ml of ammonia water as warmed up to 40° C. and a TEOS (purity 3N5) solution into the reactant inlet of the cylinder at 26.99 ml/min and 1.57 ml/min, respectively.

At this, the retention time of the reactants is about 35 minutes, with the reaction temperature maintained at about 40° C.

Subsequently, the liquid containing the silica particles is subjected to a solid-liquid separation using a centrifugal separator so that solid particles are separated from the liquid. The particles are dried out into the final silica particles.

Experimental Example 1

The metal particles prepared according to Example 1 and Comparative Example 1 are observed with an SEM analyzer.

The results are presented in Table 1 and FIGS. 5A-5B.
[Table 1] SEM measurement results

TABLE 1

| | SEM measurement results | |
| --- | --- | --- |
| | Example 1 | Comparative Example 1 |
| Temperature | 50 | 50 |
| Agitation rate | 1,000 rpm | 1,000 rpm |
| Reaction time | 4 hrs | 8 hrs |
| Process type | Continuous | Batch |
| Composition | Ni:Mn:Co = 5:2:3 | Ni:Mn:Co = 5:2:3 |
| SEM | See FIG. 5A | See FIG. 5B |

As shown in Table 1 and FIGS. 5A-5B, the metal particles prepared according to Example 1 are more uniform and faster in the reaction time than those prepared according to Comparative Example 1.

Experimental Example 2

The silica particles prepared according to Example 2 and Comparative Examples 2 and 3 are observed with an SEM analyzer.

The results are presented in Table 2 and FIGS. 6A-6B.
[Table 2] SEM measurement results

TABLE 2

| | SEM measurement results | | |
| --- | --- | --- | --- |
| | Example 1 | Comparative Example 1 | Comparative Example 2 |
| Temperature | 40 | 40 | 40 |
| Agitation rate | 600 rpm | 350 rpm | 600 rpm |
| Reaction time | 30 min | 30 min | 35 min |
| Process type | Continuous | Batch | Continuous |
| Particle size | 100 nm | 100 nm | 130 nm |
| SEM | See FIG. 6A | See FIG. 6B | See FIG. 6C |

As shown in Table 2 and FIGS. 6A-6C, the particles prepared according to Example 2 and Comparative Example 2 have a particle size of about 100 nm, while the particles prepared according to Comparative Example 3 are larger in particle size and less uniform than those prepared according to Example 2 and Comparative Example 2.

In addition, it can be seen that Example 2 capable of performing a continuous process can produce relatively uniform particles of the similar size rapidly relative to Comparative Example 2.

What is claimed is:
1. Apparatus for manufacturing particles, comprising:
at least one first reactor comprising a hollow main body extending in a lengthwise direction, first and second raw material inlets formed at a first side end of the hollow main body to open into the hollow main body, a reactant outlet formed at a second side end of the hollow main body to open into the hollow main body, and a mixer formed inside of the hollow main body to mix materials fed from the first and second raw material inlets;
a second reactor, connected to one side of said at least one first reactor, comprises a non-revolving hollow cylinder extending in a lengthwise direction, a revolving body extending in a lengthwise direction and configured in the second reactor to separate from an inner wall of the non-revolving hollow cylinder, a driver portion connected to one side end of the revolving body to rotate the revolving body, a reactant inlet formed on an outer circumference at a first side end of the non-revolving hollow cylinder in a lengthwise direction of the non-revolving hollow cylinder to open into the non-revolving hollow cylinder and connected to the reactant outlet of said at least one first reactor, an outlet formed at a second side end of the non-revolving hollow cylinder in opposition to the reactant inlet to open into the non-revolving hollow cylinder, a heat exchanger material passage formed between the outer circumference and an inner circumference of the non-revolving hollow cylinder to provide a passage for a heat exchanger material, a heat exchanger material inlet connected to the heat exchanger material passage to feed the heat exchanger material, and a heat exchanger material outlet connected to the heat exchanger material passage to discharge the heat exchanger material;

a first storage portion connected to the first raw material inlet of said at least one first reactor;

a second storage portion connected to the second raw material inlet of said at least one first reactor; and wherein the mixer is a screw.

2. The apparatus as claimed in claim 1, further comprising a solid-liquid separator portion connected to the reactant outlet of the second reactor to perform a solid-liquid separation of a product discharged from the reactant outlet into particles and liquids.

3. A method for manufacturing particles utilizing the apparatus as claimed in claim 1, comprising the steps:

connecting the first and second storage portions storing a raw material for forming particles to the first side end of the hollow main body extending in the lengthwise direction;

connecting the first side of the hollow main body to the non-revolving hollow cylinder extending in the lengthwise direction;

filling a buffer solution between the inner wall of the non-revolving hollow cylinder and the revolving body to discharge air to outside, the revolving body is configured in the non-revolving hollow cylinder and extends in a lengthwise direction to separate from the inner wall of the non-revolving hollow cylinder;

rotating the revolving body after the filling step;

feeding the raw material from the first and second storage portions into the hollow main body and mixing the raw material using a screw to cause a first reaction;

feeding a reactant after the first reaction into the non-revolving hollow cylinder while rotating the revolving body; and performing a solid-liquid separation of liquids containing particles formed from feeding the reactant.

4. The method as claimed in claim 3, wherein the liquid containing particles separated in the solid-liquid separation is from the reactant in the reactor turning to a normal state.

* * * * *